United States Patent
Tokuda (10) Patent No.: US 10,582,084 B2
(45) Date of Patent: Mar. 3, 2020

(54) DOCUMENT READING APPARATUS AND METHOD DETERMINING DOCUMENT SIZE BASED ON INPUT WIDTH AND LENGTH OVERLAPPING BACKGROUND AREA

(71) Applicant: TOSHIBA TEC KABUSHIKI KAISHA, Tokyo (JP)

(72) Inventor: Satoshi Tokuda, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/366,755

(22) Filed: Mar. 27, 2019

(65) Prior Publication Data

US 2020/0007709 A1 Jan. 2, 2020

(30) Foreign Application Priority Data

Jul. 2, 2018 (JP) ................. 2018-125878

(51) Int. Cl.
*H04N 1/387* (2006.01)
*H04N 1/00* (2006.01)

(52) U.S. Cl.
CPC ....... *H04N 1/3872* (2013.01); *H04N 1/00708* (2013.01); *H04N 1/00737* (2013.01); *H04N 1/00748* (2013.01); *H04N 1/00771* (2013.01); *H04N 1/00779* (2013.01); *H04N 1/00801* (2013.01); *H04N 1/00824* (2013.01); *H04N 1/00962* (2013.01); *H04N 2201/0094* (2013.01)

(58) Field of Classification Search
CPC ............. H04N 1/3872; H04N 1/00708; H04N 1/00737; H04N 1/00748; H04N 1/00771; H04N 1/00779; H04N 1/00801; H04N 1/00824; H04N 1/00962
See application file for complete search history.

(56) References Cited

U.S. PATENT DOCUMENTS

| | | | |
|---|---|---|---|
| 2001/0022674 A1* | 9/2001 | Kelly | G06K 9/32 358/488 |
| 2002/0054401 A1* | 5/2002 | Sasaki | H04N 1/00236 358/538 |
| 2005/0179914 A1 | 8/2005 | Fuse | |

(Continued)

FOREIGN PATENT DOCUMENTS

JP 2012-142703 A 7/2012

*Primary Examiner* — Scott A Rogers
(74) *Attorney, Agent, or Firm* — Kim & Stewart LLP (57) ABSTRACT

A document reading apparatus includes a scanner, an input device receiving an input of a width and length, and a processor configured to scan an area specified based on the input length and generate a first image, generate a second image by removing a part of the first image so that a width of the second image is equal to or greater than the input width, detect a background or non-background area in the second image, determine whether the input is appropriate based on whether all sides of an area specified based on the input width and length overlap the background area or none of the sides overlaps the non-background area on the second image, and when the input is appropriate, output a third image in which the background area is removed or the non-background area is extracted from the second image.

20 Claims, 9 Drawing Sheets (56) References Cited

U.S. PATENT DOCUMENTS

| | | | |
|---|---|---|---|
| 2007/0146811 A1* | 6/2007 | He | H04N 1/00681 358/449 |
| 2007/0177220 A1* | 8/2007 | Hatano | H04N 1/00795 358/449 |
| 2008/0024841 A1* | 1/2008 | Hattori | H04N 1/00681 358/498 |

* cited by examiner

DOCUMENT READING APPARATUS AND METHOD DETERMINING DOCUMENT SIZE BASED ON INPUT WIDTH AND LENGTH OVERLAPPING BACKGROUND AREA

CROSS-REFERENCE TO RELATED APPLICATION

This application is based upon and claims the benefit of priority from Japanese Patent Application No. 2018-125878, filed Jul. 2, 2018, the entire contents of which are incorporated herein by reference.

FIELD

Embodiments described herein relate generally to a document reading apparatus and a document reading method.

BACKGROUND

When scanning a non-standard size document, a conventional MFP (Multi-Function Peripheral) determines the size of the document through an image processing. This is because the MFP cannot determine the document size at the stage of scanning the nonstandard-size document. Thus, for reading the non-standard size document, the conventional MFP needs to scan the entire scanning area of the scanner (for example, A3 width 237 mm/LD length 432 mm).

DETAILED DESCRIPTION

In accordance with an embodiment, a document reading apparatus includes a scanner, an input device configured to receive an input of a document size including a width and a length, and a processor configured to upon receipt of the input of the document size, control the scanner to scan an area specified based on a maximum scan width and the input length and generate a first image corresponding to the scanned area, generate a second image by removing a part of the first image so that a width of the second image is equal to or greater than the input width, detect a background area or a non-background area in the second image, determine whether or not the input document size is appropriate based on whether or not all sides of an area specified based on the input width and length overlap the background area or none of the sides overlaps the non-background area on the second image, and when the input document size is appropriate, output a third image in which the background area is removed or the non-background area is extracted from the second image.

First Embodiment

Next, a first embodiment is described with reference to the accompanying drawings.

Figure 1:
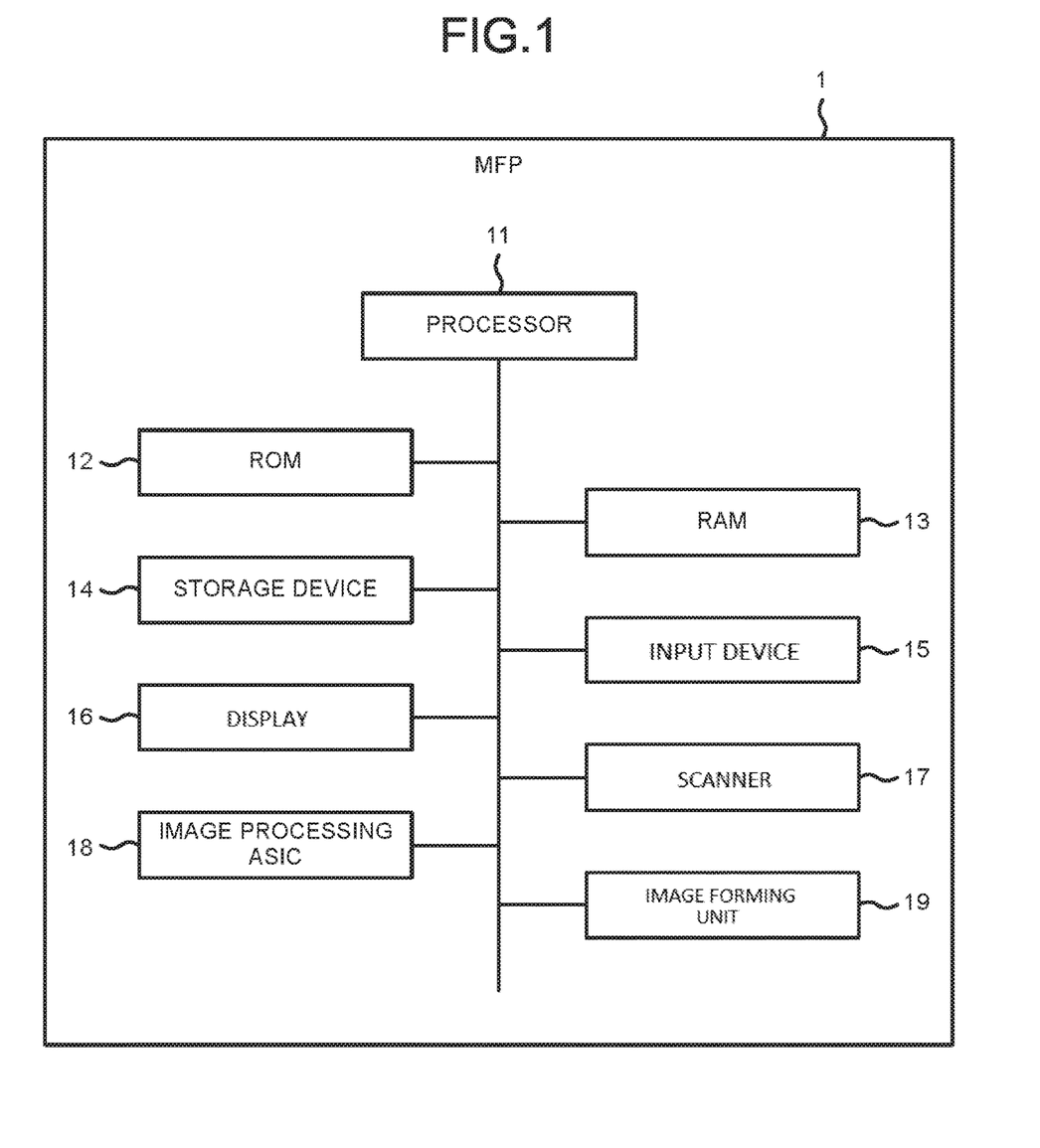
FIG. 1 is a block diagram of an MFP according to a first embodiment.

FIG. 1 is a block diagram illustrating a configuration of a MFP 1. For example, the MFP 1 is a document reading apparatus. The MFP 1 has a scanning function.

The MFP 1 includes a processor 11, a ROM (Read Only Memory) 12, a RAM (Random Access Memory) 13, a storage device 14, an input device 15, a display 16, a scanner 17, an image processing ASIC (Application Specific Integrated Circuit) 18 and an image forming unit 19.

The processor 11 controls each component of the MFP 1. For example, the processor 11 is a CPU (Central Processing Unit). The processor 11 executes various processing by executing programs stored in the ROM 12 or the storage device 14. The processor 11 executes a processing based on an input instruction, e.g., in response to an operation by a user.

The ROM 12 stores programs to be executed by the processor 11, control data, or the like.

The RAM 13 is a working memory.

The storage device 14 stores programs to be executed by the processor 11, control data and various kinds of data. The storage device 14 is a rewritable nonvolatile memory. For example, the storage device 14 is an SSD (Solid State Drive) or an HDD (Hard Disk Drive).

The input device 15 receives an input by the user. For example, the input device 15 receives an input of a reading size of a nonstandard-size document by the user. For example, the input device 15 includes a press button and a touch pad stacked on the display 16 described below.

The display 16 displays various screens. For example, the display 16 displays a screen for inputting a reading size of a nonstandard-size document. A screen for inputting the reading size of the nonstandard-size document is also referred to as a reading size input screen. An example of the reading size input screen is described later. For example, the display 16 is a liquid crystal display.

The scanner 17 reads a document in both main and sub-scanning directions to obtain an image of a document. For example, the scanner 17 first reads a nonstandard-size document in the sub-scanning direction by a distance corresponding to the reading size input by the user to obtain a first image of the document. The scanner 17 scans the document in the sub-scanning direction by a distance slightly greater than the horizontal reading size specified by the user. The scanner 17 temporarily stores the first image in the storage device 14. Typically, the reading size input by the user is set in a firmware of the scanner 17 so that the scanner 17 reads the nonstandard-size document at the reading size input by the user. Since the scanner 17 does not read the entire scanning surface in the sub-scanning direction for reading the nonstandard-size document, it is possible to shorten a time to read the nonstandard-size document. The scanner 17 can also shorten the time until a next nonstandard-size document is read. As a result, the scanner 17 can execute a scanning processing at a high speed.

For example, the image sensor of the scanner 17 is an image capturing element in which pixels for converting light to an electrical signal (image signal) are arranged in a line shape. For example, the image sensor is a CCD (Charge Coupled Device), a CMOS (Complementary Metal Oxide Semiconductor), or other image capturing elements. The scanner 17 reads a document set on a platen (document table) (not shown). The scanner 17 reads documents consecutively conveyed one by one to a position facing the scanner 17 on the platen by an ADF (not shown) or the like.

The image processing ASIC 18 performs image processing on the first image and cut out unnecessary areas from the first image. For example, the image processing ASIC 18 obtains a second image obtained by cutting out an area exceeding the area defined by the reading size input by the user from the first image in the main scanning direction. The image processing ASIC 18 temporarily stores the second image in the storage device 14. Since the scanner 17 does not read the nonstandard-size document at the maximum size by which the scanning can be performed in the sub-scanning direction, the image processing ASIC 18 can shorten the time required for the image processing in the main scanning direction. As a result, the image processing ASIC 18 can execute a scanning processing at a high speed.

The image forming unit 19 forms an image on a print medium. For example, the image forming unit 19 is a printer. For example, the image forming unit 19 comprises a photoconductive drum, an electrostatic charger, an exposure device and a developing device. The surface of the photoconductive drum is uniformly charged by the electrostatic charger. In response to the electric signal of the image data, the exposure device emits light having a wavelength capable of forming a latent image on the charged photoconductive drum, and forms an electrostatic latent image on the charged photoconductive drum. The developing device attaches toner (developer) to the electrostatic latent image formed on the photoconductive drum to form a toner image on the surface of the photoconductive drum. The image forming unit 19 transfers the toner image formed on the surface of the photoconductive drum onto the print medium and fixes the toner image to the print medium, thereby forming an image on the print medium.

The reading size input screen is described.

Figure 2:
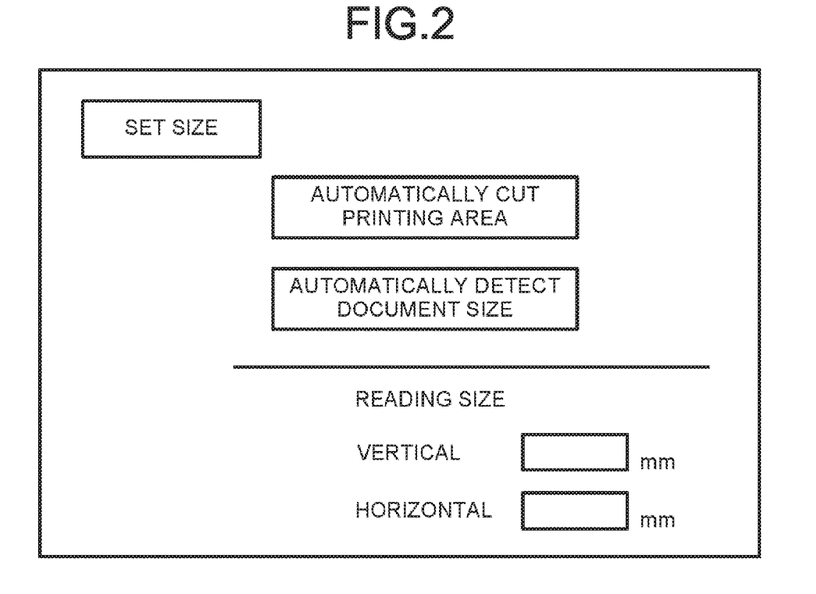
FIG. 2 is a diagram illustrating a reading size input screen according to the first embodiment.

FIG. 2 is a diagram illustrating an example of a reading size input screen displayed on the display 16.

The user uses the input device 15 to input vertical and horizontal sizes on the reading size input screen at the time of performing setting relating to scanning of the nonstandard-size document (i.e., custom size scanning). From the user's side, the vertical size corresponds to a size in the main scanning direction. The horizontal size corresponds to a size in the sub-scanning direction. The user inputs sizes close to the nonstandard-size document on the reading size input screen. For example, if the user performs setting relating to a scanning of a document having a business card size of 51*89 mm, the user inputs a slightly larger size such as 60*100 mm on the reading size input screen. If the user does not input the reading size on the reading size input screen, the scanner 17 reads the document at the maximum size by which the scanning can be performed in the sub-scanning direction according to default setting.

Figure 3:
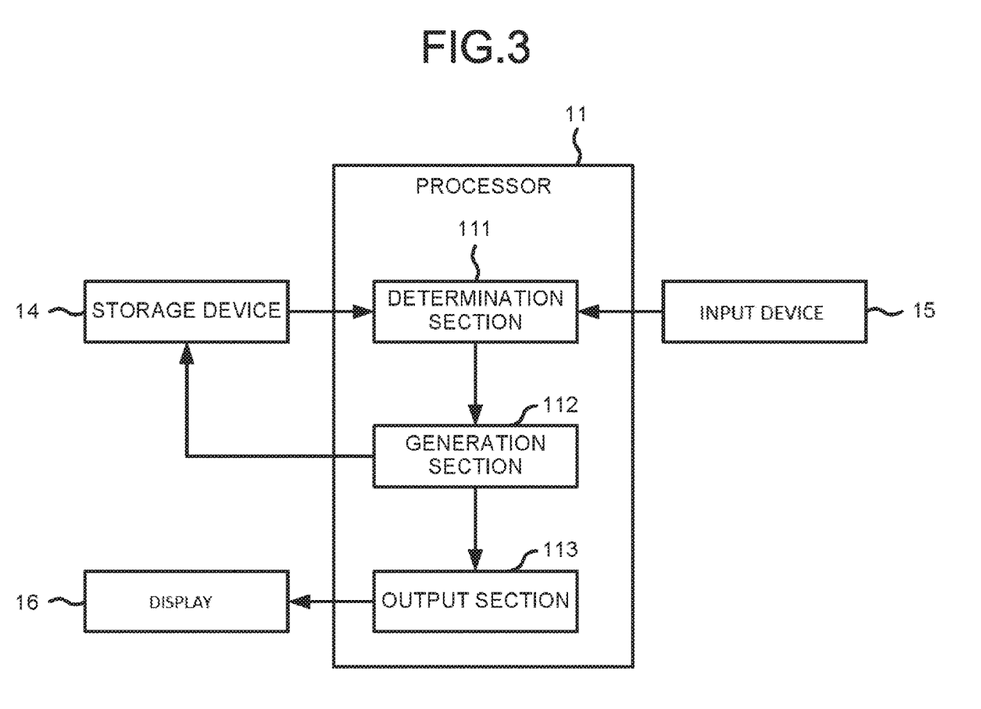
FIG. 3 is a block diagram illustrating functions performed by a processor of the MFP according to the first embodiment.

FIG. 3 is a block diagram illustrating an example of a configuration of the processor 11 of the MFP 1.

The processor 11 executes programs stored in the ROM 12 or the storage device 14 to implement the functions of a determination section 111, a generation section 112 and an output section 113, as shown in FIG. 3.

The determination section 111 is described below. The determination section 111 determines whether or not the reading size input by the user is appropriate based on the second image, as exemplified below. First, the determination section 111 acquires information indicating the reading size input by the user from the input device 15. The reading size includes the vertical size and the horizontal size input by the user. The determination section 111 acquires the second image from the storage device 14. Next, the determination section 111 determines whether or not the reading size input by the user is appropriate by executing the image processing on the second image.

In an example, the determination section 111 determines whether or not the reading size input by the user is appropriate by executing a black background detection processing on the second image. The black background detection processing is also referred to as an automatic document size detection processing. The black background detection processing is described later. In another example, the determination section 111 determines whether or not the reading size input by the user is appropriate by executing a printing area detection processing on the second image. The printing area detection processing is also referred to as a printing area automatic cutting processing. The printing area detection processing is described later.

The determination section 111 determines whether or not an area defined by the reading size input by the user covers the entire printing area of the nonstandard-size document in the second image according to the black background detection processing or the printing area detection processing performed on the second image.

If the area defined by the reading size input by the user covers the entire printing area of the nonstandard-size document in the second image, the determination section 111 determines that the reading size input by the user is equal to or larger than the size of the nonstandard-size document. As a result, the determination section 111 determines that the reading size input by the user is appropriate. One reason is that in the second image corresponding to the reading size input by the user, no printing area of the nonstandard-size document is missed. On the other hand, if the area defined by the reading size input by the user does not cover a part of the printing area of the non-standardized document in the second image, the determination section 111 determines that the reading size input by the user is less than the size of the nonstandard-size document. Thus, the determination section 111 determines that the reading size input by the user is not appropriate. One reason is that in the second image corresponding to the reading size input by the user, a part of the printing area of the nonstandard-size document is missed.

Next, the determination section 111 transmits the determination result to the generation section 112 and the output section 113. The determination result indicates that the reading size input by the user is appropriate. Alternatively, the determination result may indicate that the reading size input by the user is not appropriate.

The generation section 112 is described below. The generation section 112 generates a target image from the second image based on the determination result indicating that the reading size input by the user is appropriate, as exemplified below. The target image is also referred to as a third image. First, the generation section 112 receives the determination result from the determination section 111. Next, if the determination result indicates that the reading size input by the user is appropriate, the generation section 112 generates a third image from the second image through the image processing. If the determination section 111 determines whether or not the reading size input by the user is appropriate by executing the black background detection processing on the second image, the generation section 112 uses the black background detection processing. If the determination section 111 determines whether or not the reading size input by the user is appropriate by executing the printing area detection processing on the second image, the generation section 112 uses the printing area detection processing. The size of the third image is equal to or less than the reading size input by the user. In the third image, no printing area of the nonstandard-size document is missed. Next, the generation section 112 stores the third image in the storage device 14.

The output section 113 is described. The output section 113 outputs a message based on the determination result indicating that the reading size input by the user is not appropriate, as exemplified below. The message indicates that the reading size input by the user is not appropriate. That the reading size input by the user is not appropriate refers to that the reading size input by the user is less than the size of the nonstandard-size document. First, the output section 113 receives the determination result from the determination section 111. Next, if the determination result indicates that the reading size input by the user is not appropriate, the output section 113 outputs the message. Then, the display 16 displays the message. By checking the message on the display 16, the user can recognize that the reading size is not appropriate.

Next, the black background detection processing is described.

The black background detection processing is a processing of detecting an edge of a black area from the second image of the black background and cutting out the third image from the second image along the edge of the black area. Therefore, the size of the third image cut out from the second image is close to that of the nonstandard-size document.

In the black background detection processing, as described above, a black background is required for the second image. The black background is generated as follows. In the example in which the scanner 17 reads a nonstandard-size document conveyed by the ADF or the like, a black sheet is attached to a position facing the scanner 17 in the ADF. The scanner 17 reads the nonstandard-size document with the black sheet as a background. As a result, the background of the second image becomes black. In the example in which the scanner 17 reads a nonstandard-size document set on the platen, the user uses the scanner 17 to read a nonstandard-size document in a state in which a platen cover (not shown) is opened. Alternatively, the user may use the scanner 17 to read the nonstandard-size document in a state in which a black sheet covering the entire surface of the nonstandard-size document is sandwiched between the nonstandard-size document set on the platen and a platen cover. In this way, the background of the second image becomes black.

The processing for determining whether or not the reading size input by the user is appropriate using the black background detection processing by the determination section 111 is described.

Figure 4:
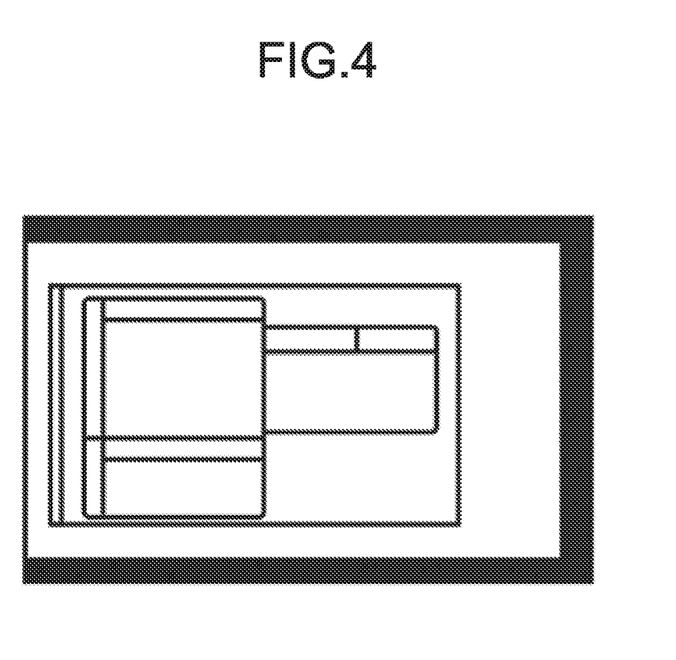
FIG. 4 is a diagram illustrating a processing of determining whether or not a reading size is appropriate using a black background detection processing according to the first embodiment.

FIG. 4 is a diagram illustrating a processing of determining whether or not the reading size input by the user is appropriate using the black background detection processing.

FIG. 4 shows a second image having a black background of which the size is equal to the reading size input by the user. In this example, the second image has the size slightly larger than the input reading size in the horizontal and vertical directions.

The determination section 111 determines a relationship between four sides defined by the reading size input by the user and a black area of the second image. The determination section 111 determines whether or not the reading size input by the user is appropriate depending on whether the four sides defined by the reading size input by the user are included in the black area of the second image. If all of the four sides defined by the reading size input by the user are included in the black area of the second image, the determination section 111 determines that the reading size input by the user is appropriate. In other words, an area defined by the reading size input by the user covers the entire printing area of the second image. On the other hand, if at least one side defined by the reading size input by the user is not included in the black area of the second image, the determination section 111 determines that the reading size input by the user is not appropriate. In other words, the area defined by the reading size input by the user does not include a part of the printing area of the second image.

The determination section 111 may determine whether or not the reading size input by the user is appropriate depending on whether the four sides of the second image are included in the black area. If all of the four sides of the second image are included in the black area, the determination section 111 determines that the reading size input by the user is appropriate. In other words, the area defined by the reading size input by the user covers the entire printing area of the second image. On the other hand, if at least one side among the four sides of the second image is not included in the black area, the determination section 111 determines that the reading size input by the user is not appropriate. In other words, the area defined by the reading size input by the user does not include a part of the printing area of the second image.

The processing of generating the third image using the black background detection processing by the generation section 112 is described.

Figure 5:
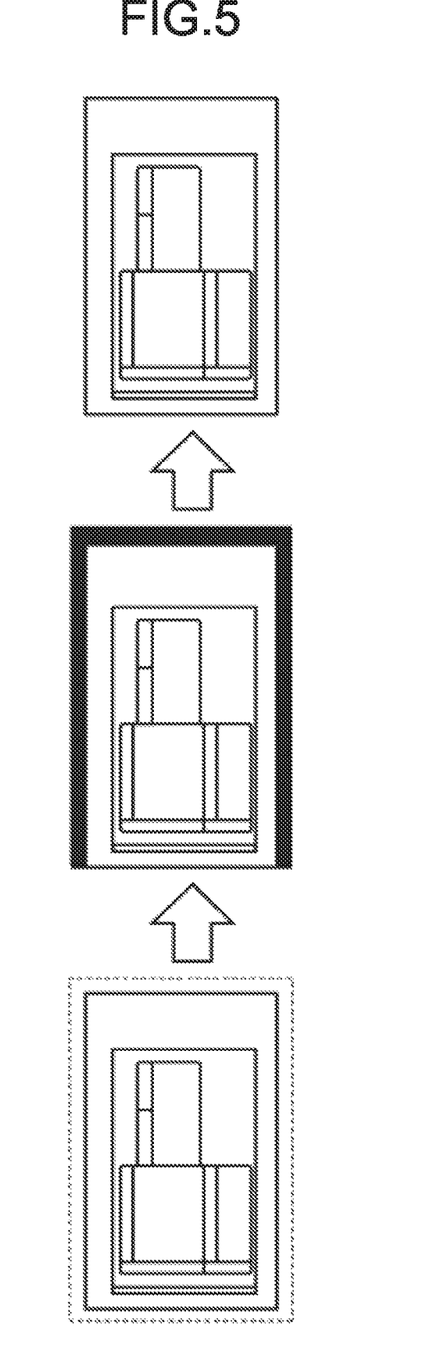
FIG. 5 is a diagram illustrating an image generation processing using the black background detection processing according to the first embodiment.

FIG. 5 is a diagram illustrating a processing of generating the third image using the black background detection processing.

A drawing on the left side of FIG. 5 shows a relationship between the reading size input by the user indicated by a broken line and the nonstandard-size document. It is assumed that an area defined by the reading size input by the user covers the entire nonstandard-sized document. As shown in a drawing in the middle of FIG. 5, the MFP 1 obtains the second image corresponding to the reading size input by the user by the scanner 17 and the image processing ASIC 18. The second image has the black background. The generation section 112 detects an edge of the black area from the second image. As shown in a drawing on the right side of FIG. 5, the generation section 112 cuts out the third image along the edge of the black area from the second image.

Next, the printing area detection processing is described.

The printing area detection processing is a processing of detecting the edge of the printing area from the second image having a white background and cutting out the third image along the edge of the printing area from the second image. For example, the edge of the printing area is detected based on detection of characters and the like in the second image. The white area of the nonstandard-size document is removed through the printing area detection processing. Therefore, the size of the third image cut out from the second image is less than the size of the nonstandard-size document.

A processing for determining whether or not the reading size input by the user is appropriate using the printing area detection processing by the determination section 111 is described.

Figure 6:
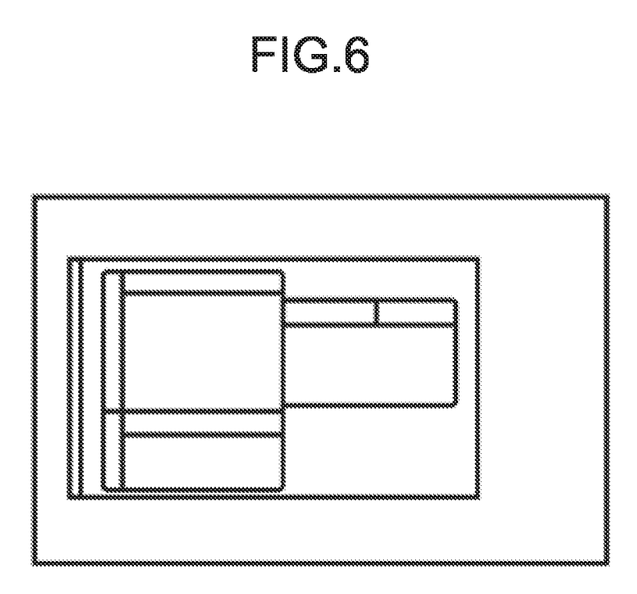
FIG. 6 is a diagram illustrating a processing of determining whether or not a reading size is appropriate using a printing area detection processing according to the first embodiment.

FIG. 6 is a diagram illustrating the processing of determining whether or not the reading size is appropriate using the printing area detection processing.

The determination section 111 determines a relationship between four sides defined by the reading size input by the user and a printing area of the second image. The determination section 111 determines whether or not the reading size input by the user is appropriate depending on whether the four sides defined by the reading size input by the user are included in the printing area of the second image. If all of the four sides defined by the reading size input by the user are not included in the printing area of the second image, the determination section 111 determines that the reading size input by the user is appropriate. In other words, the area defined by the reading size input by the user covers the entire printing area of the second image. On the other hand, if at least one side defined by the reading size input by the user is included in the printing area of the second image, the determination section 111 determines that the reading size input by the user is not appropriate. In other words, the area defined by the reading size input by the user does not include a part of the printing area of the second image.

The determination section 111 may determine whether or not the reading size input by the user is appropriate depending on whether the four sides of the second image are included in the printing area. If all of the four sides of the second image are not included in the printing area, the determination section 111 determines that the reading size input by the user is appropriate. In other words, the area defined by the reading size input by the user covers the entire printing area of the second image. On the other hand, if at least one side of the second image is included in the printing area, the determination section 111 determines that the reading size input by the user is not appropriate. In other words, the area defined by the reading size input by the user does not include a part of the printing area of the second image.

The processing of generating the third image using the printing area detection processing by the generation section 112 is described.

Figure 7:
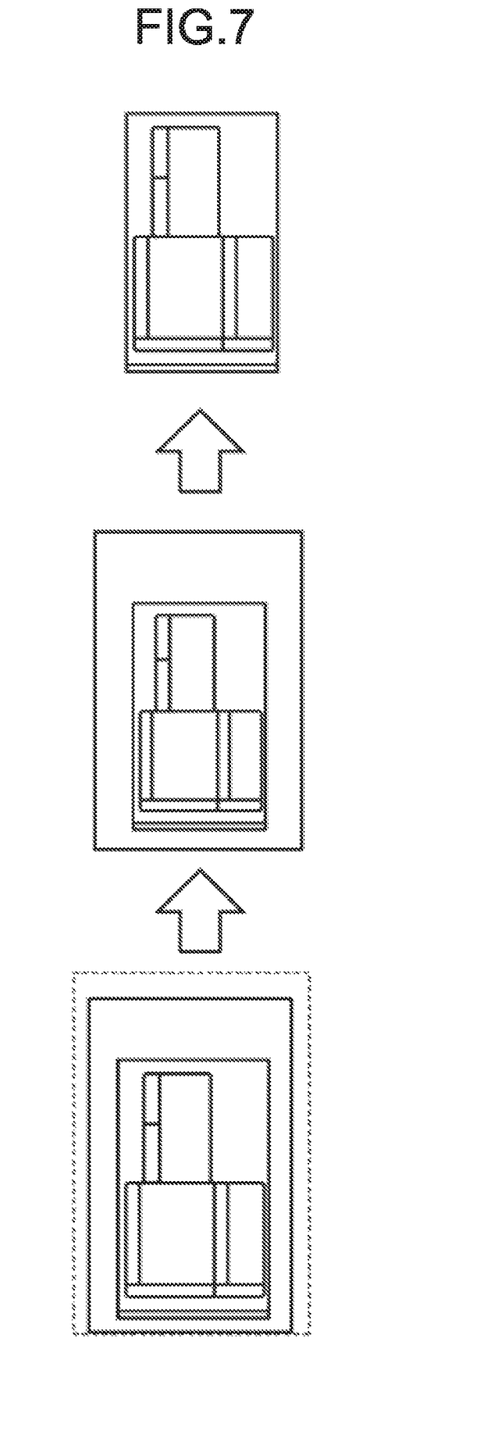
FIG. 7 is a diagram illustrating an image generation processing using the printing area detection processing according to the first embodiment.

FIG. 7 is a diagram illustrating the processing of generating the third image using the printing area detection processing.

A drawing on the left side of FIG. 7 shows a relationship between the reading size input by the user indicated by a broken line and the nonstandard-size document. It is assumed that an area defined by the reading size input by the user covers the entire nonstandard-sized document. As shown in a drawing in the middle of FIG. 7, the MFP 1 obtains the second image corresponding to the reading size input by the user by the scanner 17 and the image processing ASIC 18. The second image has the white background. The generation section 112 detects an edge of the printing area from the second image. As shown in a drawing on the right side of FIG. 7, the generation section 112 cuts out the third image along the edge of the printing area from the second image.

A scanning processing executed by the MFP 1 is described.

Figure 8:
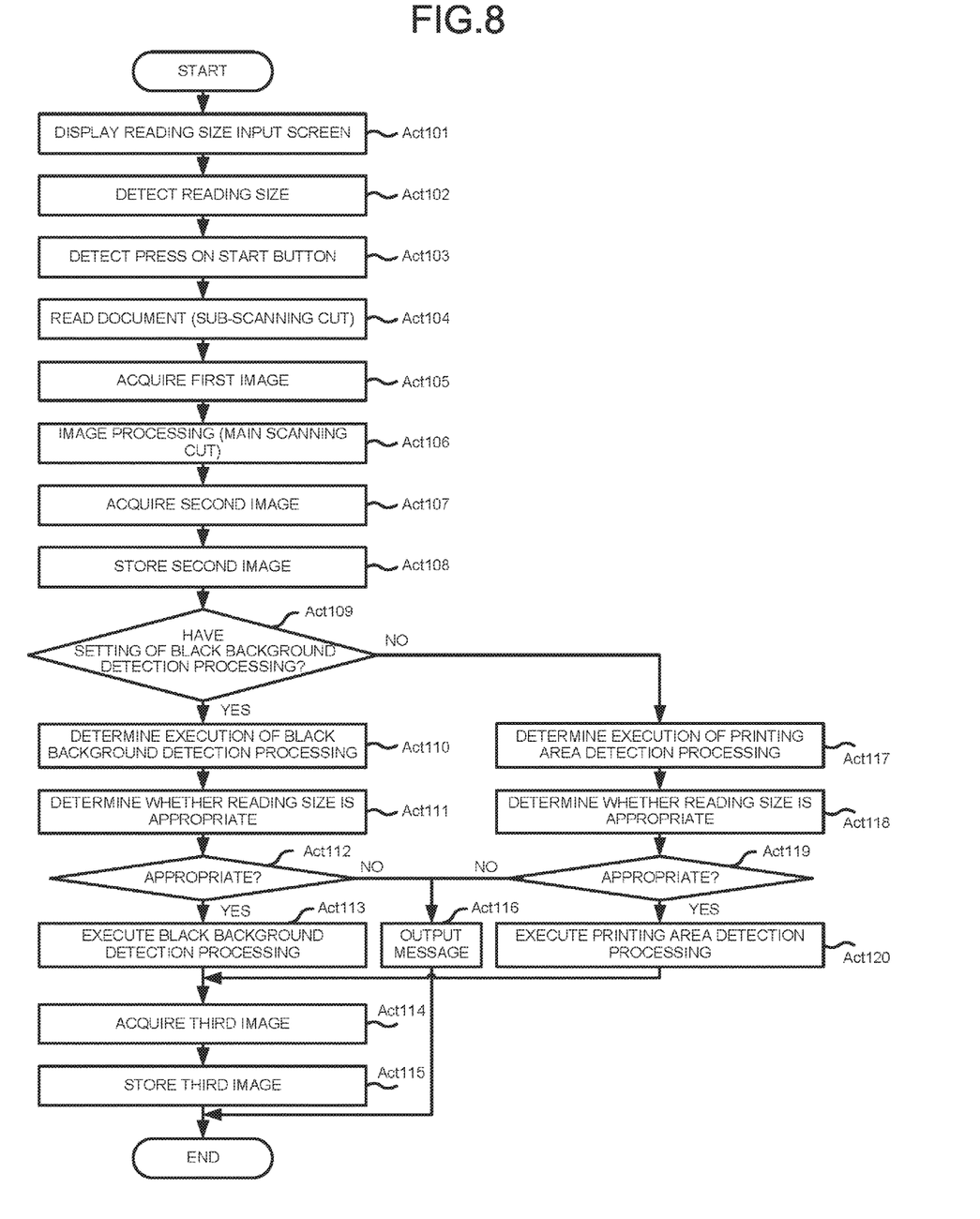
FIG. 8 is a flowchart of a scanning processing executed by the MFP according to the first embodiment.

FIG. 8 is a flowchart of the scanning processing executed by the MFP 1.

The display 16 displays a reading size input screen (Act 101). The processor 11 detects the reading size input by the user (Act 102). In Act 102, the processor 11 sets the reading size input by the user in the firmware of the scanner 17. The processor 11 detects a press on a start button by the user (Act 103).

The scanner 17 reads a nonstandard-size document in response to the press on the start button (Act 104). In Act 104, the scanner 17 reads the nonstandard-size document along the sub-scanning direction by a distance corresponding to the reading size input by the user. The scanner 17 obtains a first image of the nonstandard-size document by reading the nonstandard-size document (Act 105).

The image processing ASIC 18 executes the image processing for cutting an unnecessary area from the first image on the first image (Act 106). In Act 106, the image processing ASIC 18 cuts an area exceeding the area defined by the reading size input by the user from the first image in the main scanning direction. The image processing ASIC 18 obtains a second image by cutting the unnecessary area from the first image (Act 107). The image processing ASIC 18 temporarily stores the second image in the storage device 14 (Act 108).

The processor 11 determines whether or not the black background detection processing is set as the image processing on the second image (Act 109). If the black background detection processing is set (Yes in Act 109), the processor 11 determines to execute the black background detection processing as the image processing on the second image (Act 110).

The determination section 111 determines whether or not the reading size input by the user is appropriate through the black background detection processing performed on the second image (Act 111).

If the reading size input by the user is appropriate (Yes in Act 112), the generation section 112 executes the black background detection processing on the second image (Act 113). The generation section 112 obtains a third image by performing the black background detection processing on the second image (Act 114). The generation section 112 stores the third image in the storage device 14 (Act 115).

If the reading size input by the user is not appropriate (No in Act 112), the output section 113 outputs a message (Act 116). As a result, the MFP 1 does not execute the black background detection processing on the second image, and terminates the processing without generating the third image.

If the black background detection processing is not set (No in Act 109), the processor 11 determines to execute the printing area detection processing as the image processing on the second image (Act 117). By executing the printing area detection processing on the second image, the determination section 111 determines whether or not the reading size input by the user is appropriate (Act 118).

If the reading size input by the user is appropriate (Yes in Act 119), the generation section 112 executes the printing area detection processing on the second image (Act 120). The generation section 112 obtains the third image by the printing area detection processing on the second image (Act 114). The generation section 112 stores the third image in the storage device 14 (Act 115).

If the reading size input by the user is not appropriate (No in Act 119), the output section 113 outputs the message (Act 116). As a result, the MFP 1 does not execute the printing area detection processing on the second image, and terminates the processing without generating the third image.

The message output by the output section 113 in Act 116 may include determination about whether to continue the generation processing of the third image. The display 16 displays a screen for determining whether to continue the generation processing of the third image to the user. The user can use the input device 15 to input an instruction of continuing the generation processing of the third image. As a result, the generation section 112 executes the black background detection processing or the printing area detection processing on the second image to generate the third image.

According to the first embodiment, the MFP 1 determines whether or not the reading size input by the user is appropriate based on the second image corresponding to the reading size input by the user.

As a result, the MFP 1 can obtain an appropriate image of the nonstandard-size document while reducing the time required for the nonstandard-size document scanning processing.

The MFP 1 determines whether or not the reading size input by the user is appropriate depending on whether the four sides defined by the reading size input by the user are included in the black area of the second image.

As a result, the MFP 1 can improve an accuracy of determination about whether the reading size input by the user is appropriate. The MFP 1 can simplify the processing by commonly using the black background detection processing that can be used in the processing of generating the third image also in the processing of determining whether or not the reading size is appropriate.

The MFP 1 determines whether or not the reading size input by the user is appropriate depending on whether the printing area of the second image contains four sides defined by the reading size input by the user.

As a result, the MFP 1 can improve the accuracy of determination about whether or not the reading size input by the user is appropriate. The MFP 1 can simplify the processing by commonly using the printing area detection processing that can be used in the third image generation processing also in the processing of determining whether or not the reading size is appropriate.

The MFP 1 outputs a message based on the determination result indicating that the reading size input by the user is not appropriate.

As a result, the user can recognize that the reading size is not appropriate, and can readily reset the reading size.

Second Embodiment

In the second embodiment, before the scanner 17 reads the nonstandard-sized document, it is determined whether the size of the nonstandard-sized document satisfies a criterion corresponding to the reading size input by the user. The description of parts the same as those in the first embodiment is omitted in the second embodiment.

Figure 9:
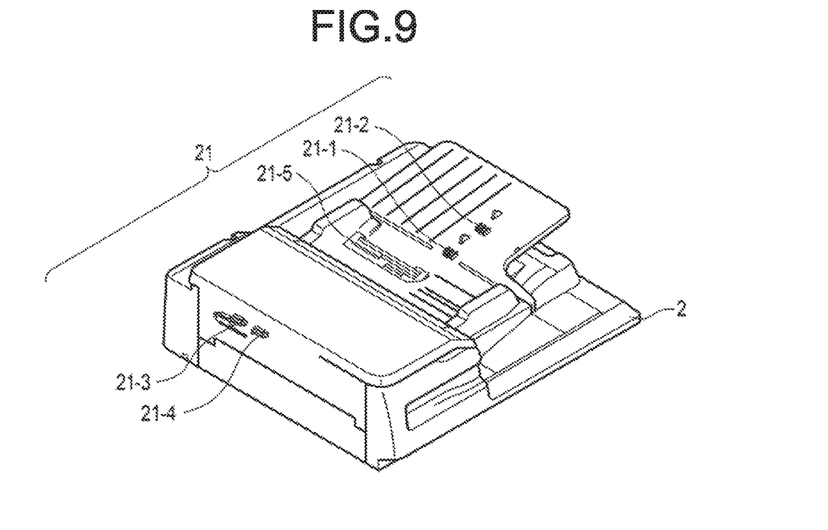
FIG. 9 is an external view of an ADF (Auto Document Feeder) according to a second embodiment.

FIG. 9 is an external view illustrating a configuration of the ADF 2 attachable to the MFP 1.

The ADF 2 can continuously convey documents one by one to a position facing the scanner 17 on the platen. The ADF 2 is an example of a document feeder. The ADF 2 comprises a detection section 21. The detection section 21 detects the size of the document set on the ADF 2. The detection section 21 includes a plurality of sensors 21-1 to 21-5. The sensors 21-1 and 21-2 are used for detecting a document length. The sensors 21-1 and 21-2 are arranged side by side along a document conveyance direction. The document length corresponds to the horizontal size of the document and the size in the sub-scanning direction. The sensors 21-3 to 21-5 are used for detecting a document width. The document width corresponds to the vertical size of the document and the size in the main scanning direction. The number of sensors included in the detection section 21 is not limited to five. Instead of the ADF 2, the MFP 1 may be attachable to a DSDF (Dual Scan Document Feeder). The DSDF is an example of the document feeder.

Figure 10:
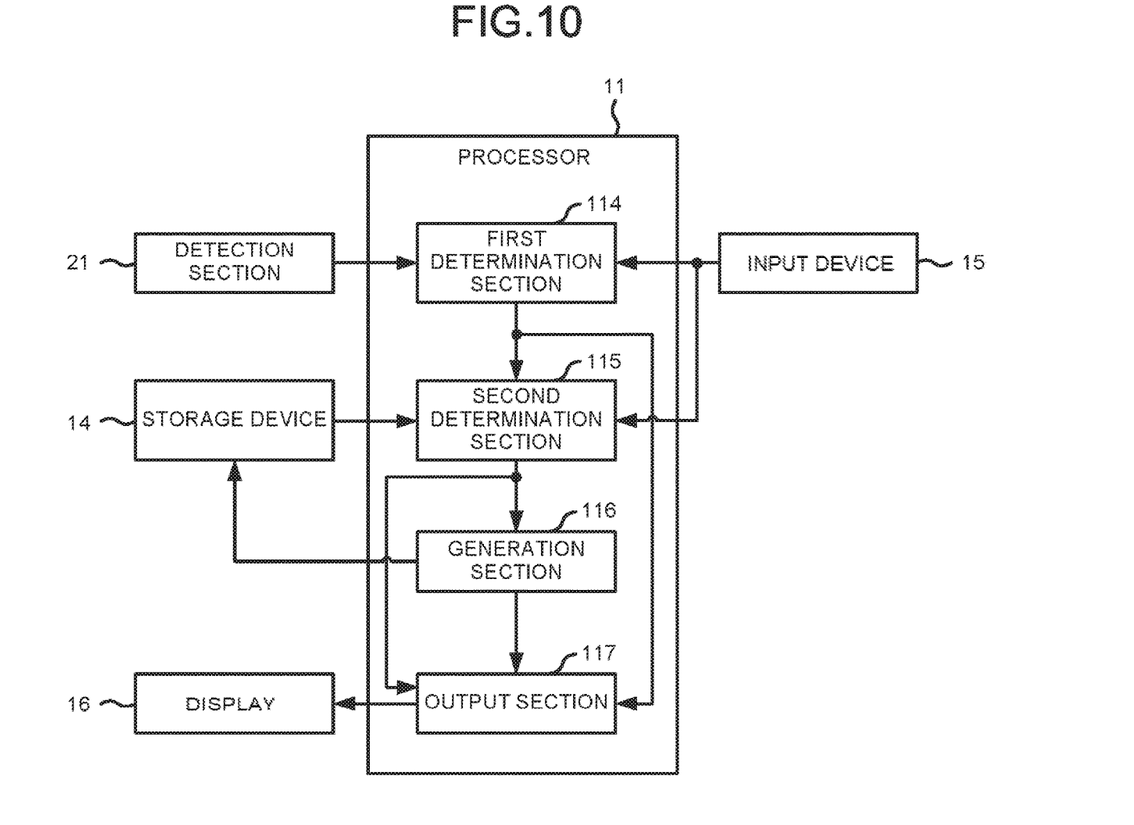
FIG. 10 is a block diagram illustrating functions performed by a processor of an MFP according to the second embodiment.

FIG. 10 is a block diagram illustrating a configuration of the processor 11 of the MFP 1.

The processor 11 executes programs stored in the ROM 12 or the storage device 14 to implement the functions of a first determination section 114, a second determination section 115, a generation section 116 and an output section 117.

The first determination section 114 is described. The first determination section 114 determines whether or not the size of the nonstandard-size document detected by the detection section 21 satisfies the criterion corresponding to the reading size input by the user, as exemplified below. In one example, the criterion is used for determining whether or not the size of the nonstandard-size document detected by the detection section 21 is equal to or less than a reading size input by the user. In this example, if the size of the nonstandard-size document detected in the detection section 21 is equal to or less than the reading size input by the user, the first determination section 114 determines that the criterion is satisfied. On the other hand, if the size of the nonstandard-size document detected by the detection section 21 is larger than the reading size input by the user, the first determination section 114 determines that the criterion is not satisfied. In another example, the criterion is used for determining whether or not the size of the nonstandard-size document detected by the detection section 21 is less than the reading size input by the user. In this example, if the size of the nonstandard-size document detected by the detection section 21 is less than the reading size input by the user, the first determination section 114 determines that the criterion is satisfied. On the other hand, if the size of the nonstandard-size document detected in the detection section 21 is not less than the reading size input by the user, the first determination section 114 determines that the criterion is not satisfied.

First, the first determination section 114 acquires information indicating the reading size input by the user from the input device 15. The reading size includes the vertical size and the horizontal size input by the user. The first determination section 114 acquires the information indicating the size of the nonstandard-size document set on the ADF 2 from the detection section 21. The size of the nonstandard-size document includes a document width and a document length.

The first determination section 114 then determines whether or not the document width contained in the information from the detection section 21 satisfies the criterion corresponding to the vertical size contained in the information from the input device 15 in response to the press on the start button by the user. In one example, the first determination section 114 determines whether or not the document width contained in the information from the detection section 21 is equal to or less than the vertical size contained in the information from the input device 15. In another example, the first determination section 114 determines whether or not the document width contained in the information from the detection section 21 is less than the vertical size contained in the information from the input device 15. Meanwhile, the first determination section 114 determines whether or not the document length contained in the information from the detection section 21 satisfies the criterion corresponding to the horizontal size contained in the information from the input device 15 in response to the press on the start button by the user. In one example, the first determination section 114 determines whether or not the document length contained in the information from the detection section 21 is equal to or less than the horizontal size contained in the information from the input device 15. In another example, the first determination section 114 determines whether or not the document length contained in the information from the detection section 21 is less than the horizontal size contained in the information from the input device 15.

If the document width contained in the information from the detection section 21 satisfies the criterion corresponding to the vertical size contained in the information from the input device 15, and the document length contained in the information from the detection section 21 satisfies the criterion corresponding to the horizontal size contained in the information from the input device 15, the first determination section 114 determines that the size of the nonstandard-size document detected by the detection section 21 satisfies the criterion corresponding to the reading size input by the user. On the other hand, if the document width contained in the information from the detection section 21 does not satisfy the criterion corresponding to the vertical size contained in the information from the input device 15, and the document length contained in the information from the detection section 21 does not satisfy the criterion corresponding to the horizontal size contained in the information from the input device 15, the first determination section 114 determines that the size of the nonstandard-size document detected by the detection section 21 does not satisfy the criterion corresponding to the reading size input by the user. If the document width contained in the information from the detection section 21 does not satisfy the criterion corresponding to the vertical size contained in the information from the input device 15, or the document length contained in the information from the detection section 21 does not satisfy the criterion corresponding to the horizontal size contained in the information from the input device 15, the first determination section 114 determines that the size of the nonstandard-size document detected by the detection section 21 does not satisfy the criterion corresponding to the reading size input by the user.

The first determination section 114 then transmits a determination result to the second determination section 115 and the output section 117. The first determination result indicates that the size of the nonstandard-size document detected by the detection section 21 satisfies the criterion corresponding to the reading size input by the user.

Alternatively, the first determination result may indicate that the size of the nonstandard-size document detected by the detection section 21 does not satisfy the criterion corresponding to the reading size input by the user. The first determination section 114 starts the operation of the ADF 2 if it is determined that the size of the nonstandard-size document detected by the detection section 21 satisfies the criterion corresponding to the reading size input by the user. Meanwhile, the first determination section 114 starts the operation of the scanner 17.

The second determination section 115 is described. The second determination section 115 acquires the second image from the storage device 14 based on the first determination result indicating that the size of the nonstandard-size document detected by the detection section 21 satisfies the criterion corresponding to the reading size input by the user. The second determination section 115 determines whether or not the reading size input by the user is appropriate based on the second image, similarly to the determination section 111 described in the first embodiment.

The second determination section 115 transmits a second determination result to the generation section 116 and the output section 117. The second determination result indicates that the reading size input by the user is appropriate. Alternatively, the second determination result may indicate that the reading size input by the user is not appropriate.

The generation section 116 is described. The generation section 116 generates the third image from the second image based on the second determination result indicating that the reading size input by the user is appropriate, similar to the generation section 112 described in the first embodiment.

The output section 117 is described. The output section 117 outputs various messages.

In one example, the output section 117 outputs a message based on the first determination result indicating that the size of the nonstandard-size document detected by the detection section 21 does not satisfy the criterion corresponding to the reading size input by the user. The message indicates that the reading size input by the user is not appropriate. In this example, first, the output section 117 receives the first determination result from the first determination section 114. Next, if the first determination result indicates that the size of the nonstandard-size document detected by the detection section 21 does not satisfy the criterion corresponding to the reading size input by the user, the output section 117 outputs the message. Then, the display 16 displays the message. By confirming the message on the display 16, the user can recognize that the reading size is not appropriate.

In another example, the output section 117 outputs a message based on the second determination result indicating that the reading size input by the user is not appropriate. The message indicates that the reading size input by the user is not appropriate. In this example, first, the output section 117 receives the second determination result from the second determination section 115. Next, if the second determination result indicates that the reading size input by the user is not appropriate, the output section 117 outputs the message. Then, the display 16 displays the message. By confirming the message on the display 16, the user can recognize that the reading size is not appropriate.

The scanning processing executed by the MFP 1 is described.

Figure 11:
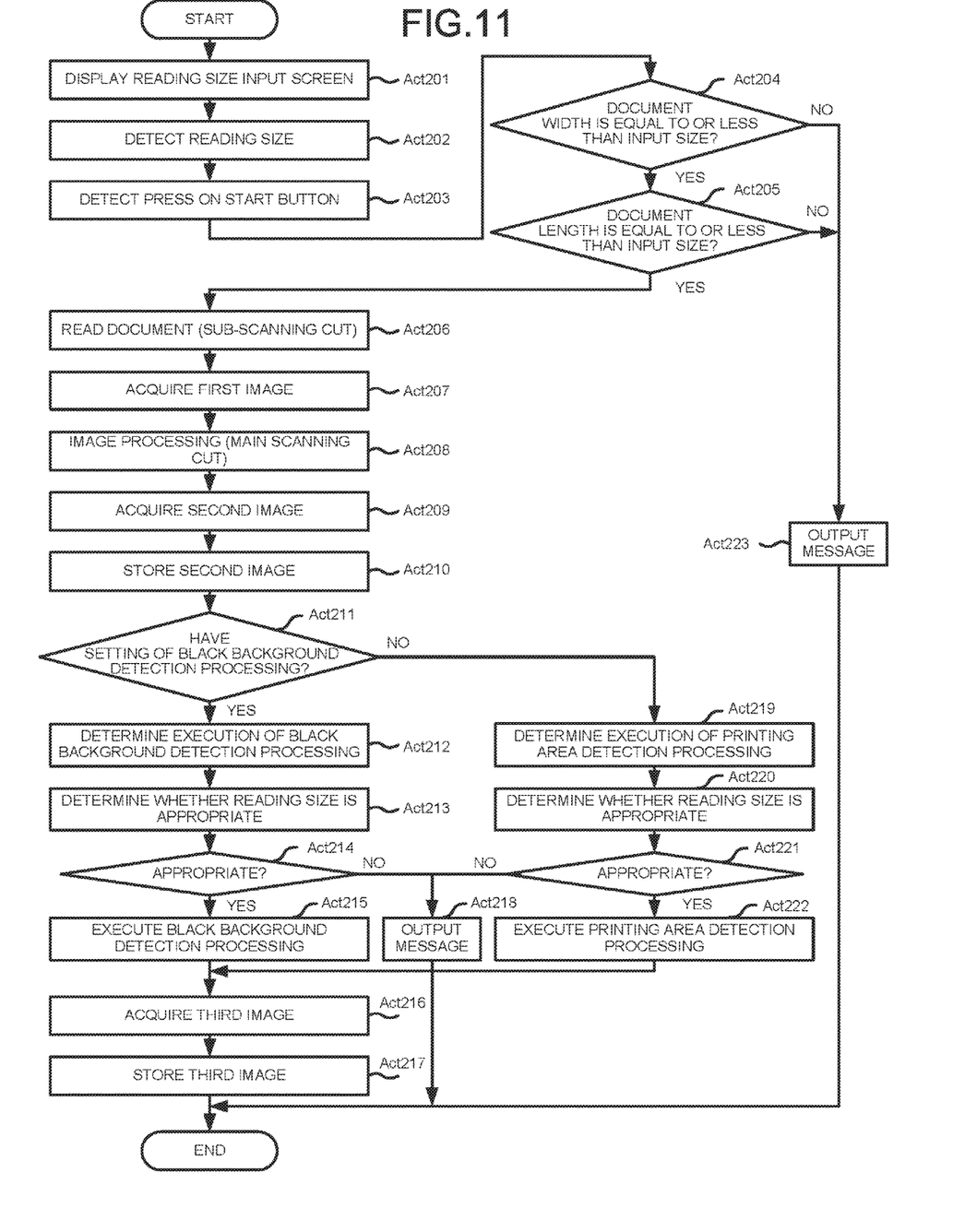
FIG. 11 is a flowchart of a scanning processing executed by the MFP according to the second embodiment.

FIG. 11 is a flowchart depicting a flow of the scanning processing executed by the MFP 1.

Here, the first determination section 114 uses a criterion for determining whether or not the size of the nonstandard-size document detected by the detection section 21 is equal to or less than the reading size input by the user.

The display 16 displays a reading size input screen (Act 201). The processor 11 detects the reading size input by the user (Act 202). The processor 11 detects a press on the start button by the user (Act 203).

The first determination section 114 determines whether or not the document width contained in the information from the detection section 21 is equal to or less than the vertical size contained in the information from the input device 15 (Act 204). If the document width is equal to or less than the vertical size (Yes in Act 204), the first determination section 114 determines whether or not the document length contained in the information from the detection section 21 is equal to or less than the horizontal size contained in the information from the input device 15 (Act 205). If the document length is equal to or less than the horizontal size (Yes in Act 205), the scanner 17 reads the nonstandard-size document (Act 206). In Act 206, the scanner 17 reads the nonstandard-size document in the sub-scanning direction by a distance corresponding to the reading size input by the user based on the first determination result indicating that the size of the nonstandard-size document detected by the detection section 21 satisfies the criterion corresponding to the reading size input by the user. The scanner 17 obtains the first image of the nonstandard-size document by reading the nonstandard-size document (Act 207).

The image processing ASIC 18 executes the image processing for cutting an unnecessary area from the first image on the first image (Act 208). In Act 208, the image processing ASIC 18 cuts an area exceeding the area defined by the reading size input by the user from the first image in the main scanning direction. The image processing ASIC 18 obtains the second image by cutting the unnecessary area from the first image (Act 209). The image processing ASIC 18 temporarily stores the second image in the storage device 14 (Act 210).

The processor 11 determines whether or not the black background detection processing is set as the image processing on the second image (Act 211). If the black background detection processing is set (Yes in Act 211), the processor 11 determines to execute the black background detection processing as the image processing on the second image (Act 212).

The second determination section 115 determines whether or not the reading size input by the user is appropriate through the black background detection processing performed on the second image (Act 213).

If the reading size input by the user is appropriate (Yes in Act 214), the generation section 116 executes the black background detection processing on the second image (Act 215). The generation section 116 obtains the third image by performing the black background detection processing on the second image (Act 216). The generation section 116 stores the third image in the storage device 14 (Act 217).

If the reading size input by the user is not appropriate (No in Act 214), the output section 117 outputs a message (Act 218). As a result, the MFP 1 disables execution of the black background detection processing on the second image, and terminates the processing without generating the third image.

If the black background detection processing is not set (No in Act 211), the processor 11 determines to execute the printing area detection processing as the image processing on the second image (Act 219). By executing the printing area detection processing on the second image, the second determination section 115 determines whether or not the reading size input by the user is appropriate (Act 220).

If the reading size input by the user is appropriate (Yes in Act 221), the generation section 116 executes the printing area detection processing on the second image (Act 222). The generation section 116 obtains the third image by the printing area detection processing on the second image (Act 216). The generation section 116 stores the third image in the storage device 14 (Act 217).

If the reading size input by the user is not appropriate (No in Act 221), the output section 117 outputs the message (Act 218). As a result, the MFP 1 disables the execution of the printing area detection processing on the second image, and terminates the processing without generating the third image. If the document width is equal to or less than the vertical size (No in Act 204), the output section 117 outputs the message (Act 223). If the document length is equal to or less than the horizontal size (No in Act 205), the output section 117 outputs the message (Act 223). As a result, the MFP 1 terminates the processing without reading the nonstandard-size document.

The message output by the output section 117 in Act 218 may include determination about whether to continue the generation processing of the third image. The display 16 displays a screen for determining whether to continue the generation processing of the third image to the user. The user can use the input device 15 to input an instruction of continuing the generation processing of the third image. As a result, the generation section 116 executes the black background detection processing or the printing area detection processing on the second image to generate the third image.

The message output by the output section 117 in Act 223 may include determination about whether to continue the reading of the nonstandard-size document. The display 16 displays a screen for determining whether to continue the reading of the nonstandard-size document to the user. The user can use the input device 15 to input an instruction of continuing the reading of the nonstandard-size document. As a result, the scanner 117 reads the nonstandard-size document.

The MFP 1 may omit the processing executed by the second determination section 115 in Act 213 and Act 214 and the processing executed by the second determination section 115 in Act 220 and Act 221. In other words, the second determination section 115 omits the processing of determining whether or not the reading size input by the user is appropriate by executing the black background detection processing on the second image. Similarly, the second determination section 115 omits the processing of determining whether or not the reading size input by the user is appropriate by executing the printing area detection processing on the second image.

According to the second embodiment, the MFP 1 includes the display 16, the detection section 21, the first determination section 114, the scanner 17 and the image processing ASIC 18. The display 16 displays the screen for inputting the reading size of a nonstandard-size document. The detection section 21 detects the size of the nonstandard-size document set on the ADF 2. The first determination section 114 determines whether or not the size of the nonstandard-size document detected by the detection section 21 satisfies the criterion corresponding to the reading size input by the user. Based on the first determination result indicating that the size of the nonstandard-size document detected by the detection section 21 satisfies the criterion corresponding to the reading size input by the user, the scanner 17 reads the nonstandard-size document as it moves in the sub-scanning direction by a distance corresponding to the reading size input by the user to obtain the first image of the nonstandard-size document. The image processing ASIC 18 obtains the second image obtained by cutting out an area exceeding the area defined by the reading size input by the user from the first image in the main scanning direction.

As a result, the MFP 1 can determine whether or not the reading size input by the user is appropriate without reading the nonstandard-size document. Since the MFP 1 omits the unnecessary reading operation of the nonstandard-size document, it is possible to acquire an appropriate image of the nonstandard-size document while reducing the time required for the nonstandard-size document scanning processing.

The second determination section 115 determines whether or not the reading size input by the user is appropriate based on the second image.

The detection accuracy of the size of the nonstandard-size document by the detection section 21 depends on the number of sensors provided in the detection section 21. If the number of sensors is small, the first determination section 114 may not appropriately determine whether or not the size of the nonstandard-size document detected by the detection section 21 satisfies the criterion corresponding to the reading size input by the user. The MFP 1 can appropriately determine whether or not the reading size input by the user is appropriate by performing the determination processing by the second determination section 115 in addition to the determination processing by the first determination section 114. In this manner, the MFP 1 can reduce the time required for the nonstandard-size document scanning processing t by executing the determination processing by the first determination section 114, and can acquire an appropriate image of the nonstandard-size document by executing the determination processing by the second determination section 115.

The output section 117 outputs the message based on the first determination result by the first determination section 114 which indicates that the size of the nonstandard-size document detected by the detection section 21 does not satisfy the criterion corresponding to the reading size input by the user.

As a result, the user can recognize that the reading size is not appropriate, and can readily reset the reading size.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A document reading apparatus comprising:
   a scanner;
   an input device configured to receive an input of a document size including a width and a length; and
   a processor configured to
      upon receipt of the input of the document size, control the scanner to scan an area specified based on a maximum scan width and the input length and generate a first image corresponding to the scanned area;
      generate a second image by removing a part of the first image so that a width of the second image is equal to or greater than the input width;
      detect a background area or a non-background area in the second image;
      determine whether or not the input document size is appropriate based on whether or not all sides of an area specified based on the input width and length overlap the background area or none of the sides overlaps the non-background area on the second image; and
      when the input document size is appropriate, output a third image in which the background area is removed or the non-background area is extracted from the second image.

2. The document reading apparatus according to claim 1, wherein the processor is configured to detect the background area that corresponds to an area where any part of the document is not included in the second image.

3. The document reading apparatus according to claim 2, further comprising:
   an image sensor and
   a black sheet attached to a portion of the scanner that faces the image sensor when the scanner scans the document.

4. The document reading apparatus according to claim 3, further comprising:
   a memory; wherein
   the processor is configured to store in the memory the third image in which the background area filled with black pixels is removed from the second image.

5. The document reading apparatus according to claim 1, wherein
   the processor is configured to detect the non-background area by recognizing characters printed on the document.

6. The document reading apparatus according to claim 5, further comprising:
   a memory; wherein
   the processor is configured to store in the memory the third image by extracting the non-background area surrounded by the background area filled with white pixels.

7. The document reading apparatus according to claim 1, further comprising:
   a display, wherein
   when the input document size is not appropriate, the processor controls the display to display a message indicating that the input document size is not appropriate.

8. The document reading apparatus according to claim 1, wherein
   the input device is configured to accept an input of a non-standard size.

9. The document reading apparatus according to claim 1, wherein
   the scanner comprises a platen and a platen cover to scan the document therebetween.

10. The document reading apparatus according to claim 1, wherein
    the scanner comprises an image sensor and a conveyer that conveys the document to the image sensor.

11. A method performed by a document reading apparatus, the method comprising:
    receiving an input of a document size including a width and a length through an input device;
    upon receipt of the input of the document size, scanning, through a scanner, an area specified based on a maximum scan width and the input length and generating a first image corresponding to the scanned area;
    generating a second image by removing a part of the first image so that a width of the second image is equal to or greater than the input width;
    detecting a background area or a non-background area in the second image;
    determine whether or not the input document size is appropriate based on whether or not all sides of an area specified based on the input width and length overlap the background area or none of the sides overlaps the non-background area on the second image; and
    when the input document size is appropriate, outputting a third image after removing the background area or extracting the non-background area from the second image.

12. The method according to claim 11, wherein
the background area corresponds to an area where any part of the document is not included in the second image.

13. The method according to claim 12, wherein
a black sheet is attached to a portion of the scanner that faces an image sensor when the scanner scans the document.

14. The method according to claim 13, wherein
the third image in which the background area filled with black pixels is removed from the second image.

15. The method according to claim 11, wherein
the non-background area is detected by recognizing characters printed on the document.

16. The method according to claim 11, wherein
the third image in which the non-background area surrounded by the background area filled with white pixels is extracted, is stored in a memory.

17. The method according to claim 11, further comprising:
when the input document size is not appropriate, displaying on a display a message indicating that the input document size is not appropriate.

18. The method according to claim 11, wherein
the input device is configured to accept an input of a non-standard size document.

19. The method according to claim 11, wherein
the scanner comprises a platen and a platen cover to scan the document therebetween.

20. A document reading apparatus comprising:
a scanner;
an input device configured to receive an input of a document size including a width and a length;
a sensor configured to detect the document size of a document to be scanned; and
a processor configured to
determine whether or not the detected document size is equal to or less than the input document size,
when the detected document size is equal to or less than the input document size, control the scanner to scan an area specified based on a maximum scan width and the input length and generate a first image corresponding to the scanned area;
generate a second image by removing a part of the first image so that a width of the second image is equal to or greater than the input width;
detect a background area or a non-background area in the second image;
determine whether or not the input document size is appropriate based on whether or not all sides of an area specified based on the input width and length overlap the background area or none of the sides overlaps the non-background area on the second image; and
when the input document size is appropriate, output a third image in which the background area is removed or the non-background area is extracted from the second image.

* * * * *